US012663589B2

(12) United States Patent
Cheben et al.

(10) Patent No.: US 12,663,589 B2
(45) Date of Patent: Jun. 23, 2026

(54) WAVEGUIDE ANTENNA

(71) Applicants: NATIONAL RESEARCH COUNCIL OF CANADA, Ottawa (CA); CARLETON UNIVERSITY, Ottawa (CA)

(72) Inventors: Pavel Cheben, Ottawa (CA); Jens H. Schmid, Ottawa (CA); Pablo Ginel-Moreno, Málaga (ES); Daniel Pereira-Martin, Málaga (ES); Abdelfettah Hadij-Elhouati, Málaga (ES); Winnie N. Ye, Ottawa (CA); Daniele Melati, Ottawa (CA); Dan-Xia Xu, Ottawa (CA); Siegfried Janz, Ottawa (CA); Alejandro Sanchez-Postigo, Ottawa (ES); Alejandro Ortega-Monux, Malaga (ES); Inigo Molina-Fernandez, Malaga (ES); J. Gonzalo Wangueemert-Perez, Malaga (ES)

(73) Assignee: NATIONAL RESEARCH COUNCIL OF CANADA, Ottawa (CA)

( * ) Notice: Subject to any disclaimer, the term of this patent is extended or adjusted under 35 U.S.C. 154(b) by 414 days.

(21) Appl. No.: 18/005,503

(22) PCT Filed: Jul. 14, 2021

(86) PCT No.: PCT/IB2021/056351
§ 371 (c)(1),
(2) Date: Jan. 13, 2023

(87) PCT Pub. No.: WO2022/013779
PCT Pub. Date: Jan. 20, 2022

(65) Prior Publication Data
US 2023/0273373 A1 Aug. 31, 2023

Related U.S. Application Data

(60) Provisional application No. 63/051,404, filed on Jul. 14, 2020.

(51) Int. Cl.
*G02B 6/34* (2006.01)

(52) U.S. Cl.
CPC ...................................... *G02B 6/34* (2013.01)

(58) Field of Classification Search
None
See application file for complete search history.

(56) References Cited

U.S. PATENT DOCUMENTS

| | | | | | |
|---|---|---|---|---|---|
| 5,577,141 A | * | 11/1996 | Adar | ...................... | G02B 6/122 385/43 |
| 5,796,510 A | * | 8/1998 | Yao | ...................... | H01Q 3/2682 359/259 |

(Continued)

OTHER PUBLICATIONS

Marchetti, Riccardo, et al. "Coupling strategies for silicon photonics integrated chips." Photonics Research 7.2 (2019): 201-239.

(Continued)

*Primary Examiner* — Chris H Chu
(74) *Attorney, Agent, or Firm* — PERRY + CURRIER INC.

(57) ABSTRACT

An interface device for performing off-chip coupling in optical waveguides includes an optical waveguide core for propagating light of a particular wavelength or a plurality of wavelengths and an array of radiative elements configured to change the propagation direction of the light. The optical waveguide core is configured to control the effective refractive index of the propagation mode of the light. The device can thus serve as an optical antenna for coupling between a (Continued)

waveguide mode and a free-space propagating beam or a plurality of free-space propagating beams in an arrayed configuration.

18 Claims, 9 Drawing Sheets

(56) References Cited

U.S. PATENT DOCUMENTS

| | | | | |
|---|---|---|---|---|
| 10,983,273 | B1 * | 4/2021 | Phare | G01S 17/42 |
| 2006/0093012 | A1 * | 5/2006 | Singh | H01S 5/141 |
| | | | | 372/102 |
| 2008/0193080 | A1 | 8/2008 | Cheben et al. | |
| 2009/0058747 | A1 | 3/2009 | Haziza | |
| 2009/0243950 | A1 * | 10/2009 | Manasson | H01Q 13/02 |
| | | | | 343/785 |
| 2013/0277331 | A1 * | 10/2013 | Dupuis | G02B 6/125 |
| | | | | 216/24 |
| 2019/0219886 | A1 * | 7/2019 | Watts | G02B 6/29331 |
| 2023/0085413 | A1 * | 3/2023 | Clavijo | H01Q 11/02 |
| | | | | 343/785 |

OTHER PUBLICATIONS

Emsley, Matthew K. et al. "Silicon substrates with buried distributed Bragg reflectors for resonant cavity-enhanced optoelectronics." IEEE Journal of Selected Topics in Quantum Electronics 8.4 (2002): 948-955.

* cited by examiner (a)

(b)

800 a

800 b

WAVEGUIDE ANTENNA

FIELD OF THE INVENTION

The present disclosure generally relates to the field of optical waveguides. More particularly, examples of the disclosure relate to a waveguide antenna device for performing light emission to free-space from such waveguides.

BACKGROUND OF THE DISCLOSURE

The capability to control propagation of light in optical waveguides is a prerequisite for many applications areas of integrated optics, photonics, and optoelectronics. One such area is the coupling of light between planar waveguides and the outside macroscopic world. Numerous proposals have been made to address coupling between planar waveguides and external devices using edge couplers and surface grating couplers, as summarized by R. Marchetti et al., Coupling strategies for silicon photonics, Photonics Research, Vol. 7, No. 2, pp. 201-239, February 2019.

Edge couplers are positioned at the edge of a photonic chip and can provide high coupling efficiency and a broad operational wavelength range. Surface grating couplers, located at the chip surface, use a diffraction grating to resonantly couple light between planar waveguides and optical fibres, allowing wafer-scale testing and relaxed alignment tolerances for fibre attachment. However, these coupling interfaces are specifically designed for coupling between planar waveguides and optical fibres and hence are not optimized for free-space coupling.

Waveguide grating antennas can be used for coupling between planar waveguides and free-space propagating beams. Such antennas typically use sidewall modulated waveguide gratings, which have moderate emission efficiency and poor control of the radiation strength [see K. Van Acoleyen, W. Bogaerts, J. Jágerská, N. Le Thomas, R. Houdré, and R. Baets, Opt. Lett. 34, 1477 (2009), J. K. Doylend, M. J. R Heck, J. T. Bovington, J. D. Peters, L. A. Coldren and J. E. Bowers, Opt. Express 19, 21595 (2011)].

Waveguide antenna architectures that provide accurate control of radiation strength with high emission efficiency remain a challenge, particularly in silicon waveguides such as those implemented in silicon-on-insulator (SOI) platform, due to their high index contrast making it difficult to achieve low radiation strength required for long waveguide antennas. Weak diffractive corrugations have been implemented in waveguide sidewalls to reduce grating strength [see T. Kim, P. Bhargava, C. V. Poulton, J. Notaros, A. Yaacobi, E. Timurdogan, C. Baiocco, N. Fahrenkopf, S. Kruger, T. Ngai, Y. Timalsina, M. R. Watts, and V. Stojanovic, IEEE J. Solid-State Circuits 54, 3061 (2019); C. V. Poulton, A. Yaacobi, D. B. Cole, M. J. Byrd, M. Raval, D. Vermeulen, and M. R. Watts, Opt. Lett. 42, 4091 (2017); S. A. Miller, Y.-C. Chang, C. T. Phare, M. C. Shin, M. Zadka, S. P. Roberts, B. Stern, X. Ji, A. Mohanty, O. A. Jimenez Gordillo, U. D. Dave, and M. Lipson, Optica 7, 3 (2020)], but this necessitates the use of very small perturbations with feature sizes below 10 nm, which are difficult to fabricate with precision in state-of-the-art photonic foundries.

To overcome this limitation, the use of silicon nitride (SiN) waveguide platform has been proposed [see C.-S. Im, B. Bhandari, K.-P. Lee, S.-M. Kim, M.-C. Oh, and S.-S. Lee, Opt. Express 28, 3270 (2020); Q. Wang, S. Wang, L. Jia, Y. Cai, W. Yue, and M. Yu, Opt. Express 29, 10509 (2021); C. V. Poulton, M. J. Byrd, M. Raval, Z. Su, N. Li, E. Timurdogan, D. Coolbaugh, D. Vermeulen, and M. R. Watts, Opt.

Lett. 42, 21 (2017)]. The lower refractive index of SiN material allows for an accurate tuning of the grating modulation strength, however at the expense of losing the advantage of high integration density of silicon waveguides. Raval et al. "Unidirectional waveguide grating antennas with uniform emission for optical phase arrays," Optics Letters, Jun. 6, 2017, discloses a design including two silicon nitride layers where the grating strength is controlled by changing the grating modulation depth. However, this device has a complicated fabrication process and the ability to steer the beam by tuning the wavelength is limited because of the small index contrast of this platform. In US patent application 2020/0158956 A1, publication date May 21, 2020 by Lipson et al., a millimetre scale weak grating coupler is disclosed comprising a silicon waveguide having bars of overlay SiN material. However, such device has a limited radiation efficiency due to device vertical symmetry. Also, in addition to patterning of silicon waveguide, it is required to form the grating in the SiN overlay on top of a narrow silicon waveguide, which complicates the fabrication process.

A specific application requiring efficient coupling to free-space beams is in the field of on-chip optical phased arrays (OPAs), for the rapid and precise steering of optical beams without mechanical scanners, such as the development of light detection and ranging (LIDAR) systems for remote sensing and autonomous vehicles navigation, which requires efficient shaping of narrow free-space laser beams. While conventional bulk-optics systems can generate, shape, and steer a narrow optical beam, they require mechanical assemblies, based on opto-mechanical systems, and scanning speeds are limited to the millisecond range, which restricts their use. On-chip integration can dramatically reduce device size, weight, and power consumption, so that the LIDAR can be mounted on drones, cars, satellites, or carried as a handheld device. Furthermore, lithographic accuracy of the semiconductor fabrication process ensures that optical path lengths are accurately controlled on-chip, well into the subwavelength regime.

For OPA devices, where small beam divergence is required, long antennas with weak radiation coupling and uniform spatial field profile are desirable.

Thus, it will be appreciated that the ability to control waveguide antenna strength and efficiency is a prerequisite for developing interfaces for coupling of light between planar waveguides and free-space beams. A general mechanism is disclosed herein for controlling antenna coupling strength and emission efficiency in a prescribed manner with little or no detrimental effects such as loss penalty, back-reflections or radiation to higher-order beams, and using a straightforward fabrication process.

Any discussion of problems provided in this section has been included in this disclosure solely for the purposes of providing a background for the present invention, and should not be taken as an admission that any or all of the discussion was known at the time the invention was made.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

FIG. 8a illustrates a schematic perspective view of an array of waveguide antenna devices according to the embodiments of FIGS. 1a-1b.

FIG. 8b shows an SEM image of a fabricated array according to FIG. 8a.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present disclosure.

DETAILED DESCRIPTION OF EXEMPLARY EMBODIMENTS

The description of exemplary embodiments of the present disclosure provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

As discussed in greater detail below, a surface emitting waveguide antenna device is provided with radiating elements separated from the waveguide core. In an aspect, the antenna comprises a metamaterial waveguide core formed by a periodic subwavelength grating, with the pitch $\Lambda_{SWG}$ smaller than ½ of the effective wavelength of light in the waveguide for controlling the effective index of the waveguide mode to suppress diffraction effects. In another aspect, the waveguide core is solid, wherein the effective index of the waveguide mode is controlled by the width of the waveguide core. The waveguide core evanescently couples the propagating mode to the radiative elements separated from the waveguide core. This allows for accurate control of the antenna radiation strength and achieves weak mode coupling in long surface emitting antennas, as required for narrow diffraction-limited far-field radiation patterns.

According to an aspect of this description, there is provided a waveguide antenna device for performing light emission to free-space, comprising a waveguide core having an effective refractive index to support the waveguide mode for propagating light of at least one wavelength; and an array of radiative elements arranged in a longitudinal direction along said waveguide core and laterally separated therefrom, and with a pitch to optically diffract light off a plane of the waveguide.

Figures 1A, 1B, 1C, 1D:
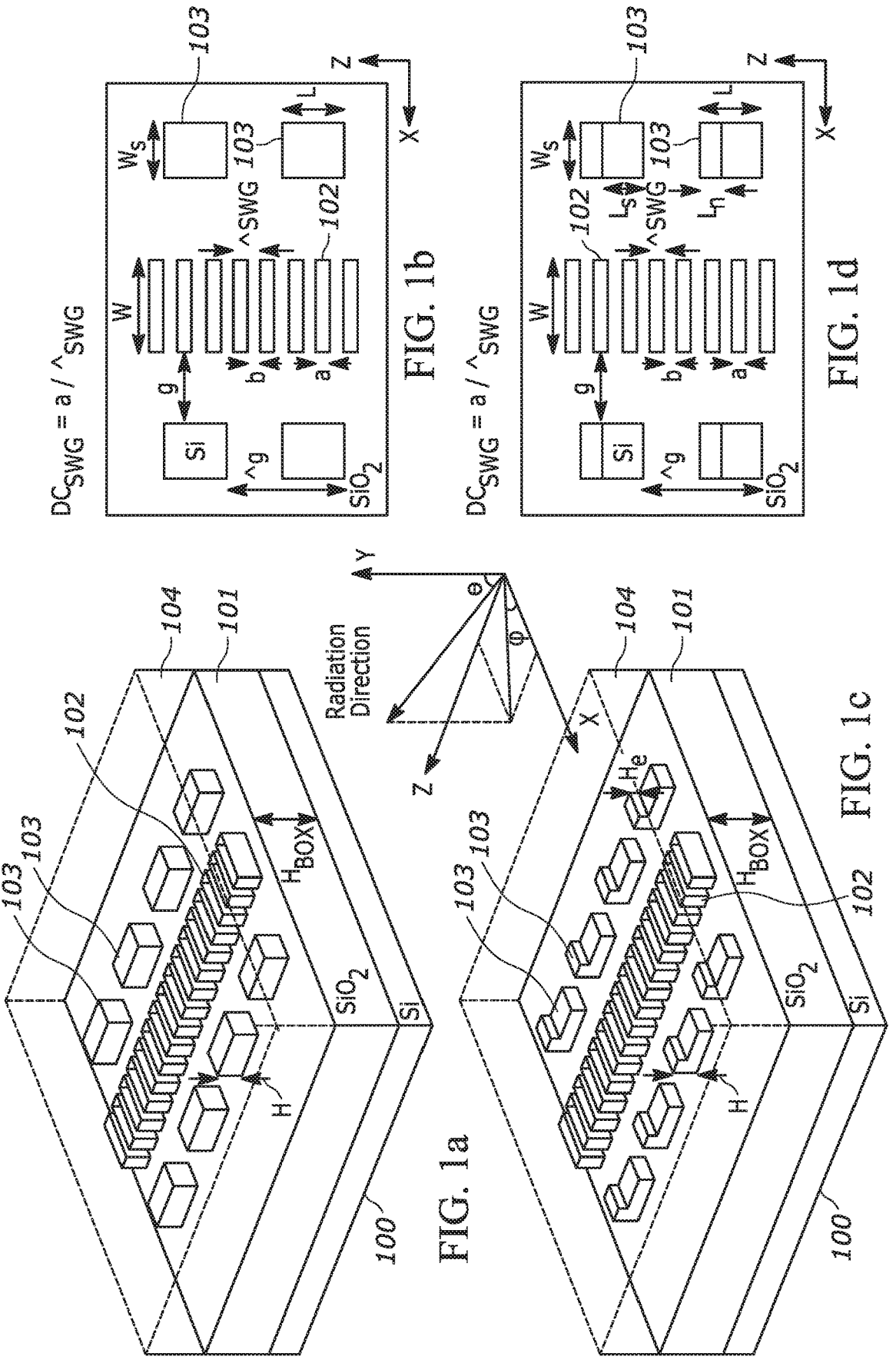
FIGS. 1a and 1b are perspective and top schematic views, respectively, of a waveguide antenna device according to a first embodiment.
FIGS. 1c and 1d are perspective and top schematic views, respectively, of a waveguide antenna device according to a second embodiment.
Figure 1E:
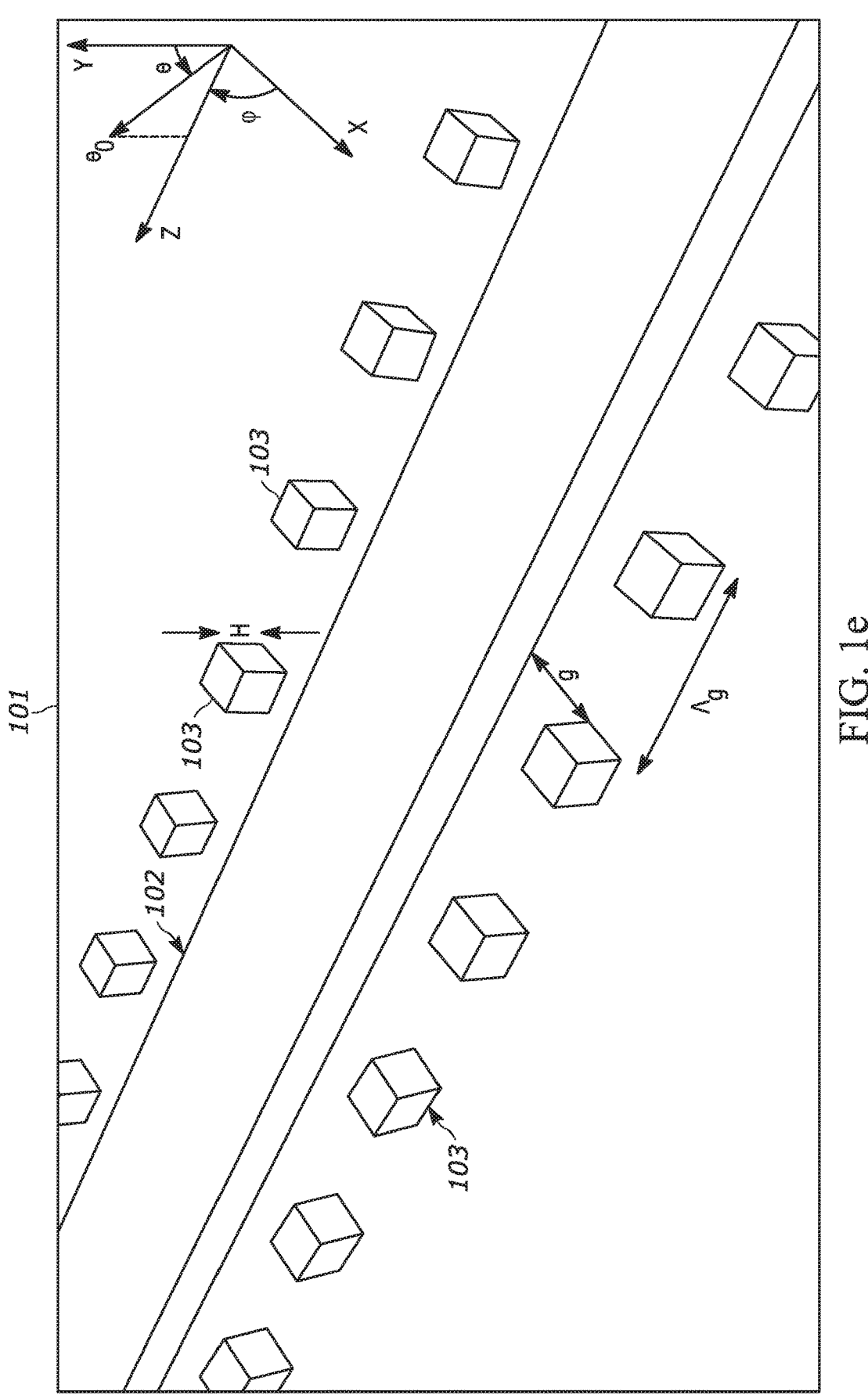
FIG. 1e is a simplified perspective schematic view of a waveguide antenna device according to a third embodiment.

Turning to FIGS. 1a and 1b, an embodiment of waveguide antenna device is shown comprising an SOI (silicon-on-insulator) Si substrate 100, an $SiO_2$ bottom cladding layer, or buried oxide (BOX) 101, a silicon subwavelength grating (SWG) waveguide core 102 and an array of cube-shaped radiating elements 103. Optionally, an $SiO_2$ upper cladding layer 104 may be provided (shown with dotted lines). In the embodiment shown in FIGS. 1c and 1d, the radiating elements 103 are L-shaped. In the embodiment of FIG. 1e, which is simplified by not depicting the $SiO_2$ bottom cladding layer, the radiating elements 103 are cube-shaped and the waveguide core 102 is solid. It should be noted that radiating elements 103 are not required to be cube or L-shaped, but can be cylindrical, oval or other suitable shapes.

In the embodiments of FIGS. 1a-1e, the design parameters of the SWG waveguide core 102, i.e. the width (W), the pitch ($\Lambda_{SWG}$) and the duty cycle ($DC_{SWG}=a/\Lambda_{SWG}$), are chosen to obtain a specific value of the effective refractive index of the waveguide mode with minimal leakage loss to the silicon substrate 100. Properties of the SWG may be chosen and/or varied to effect a change in the effective refractive index of the first waveguide core, said property being selected from the group consisting of: duty ratio, pitch, width, modulation depth, and any combination thereof. Controlling the delocalization of the waveguide mode by the effective refractive index allows for enlarging the gap (g) between the waveguide core 102 and lateral radiating elements 103 and also allows for enlarged radiative elements 103 to ease fabrication. The radiative elements 103 are periodically arrayed with a pitch of $\Lambda_g$.

Figure 2:
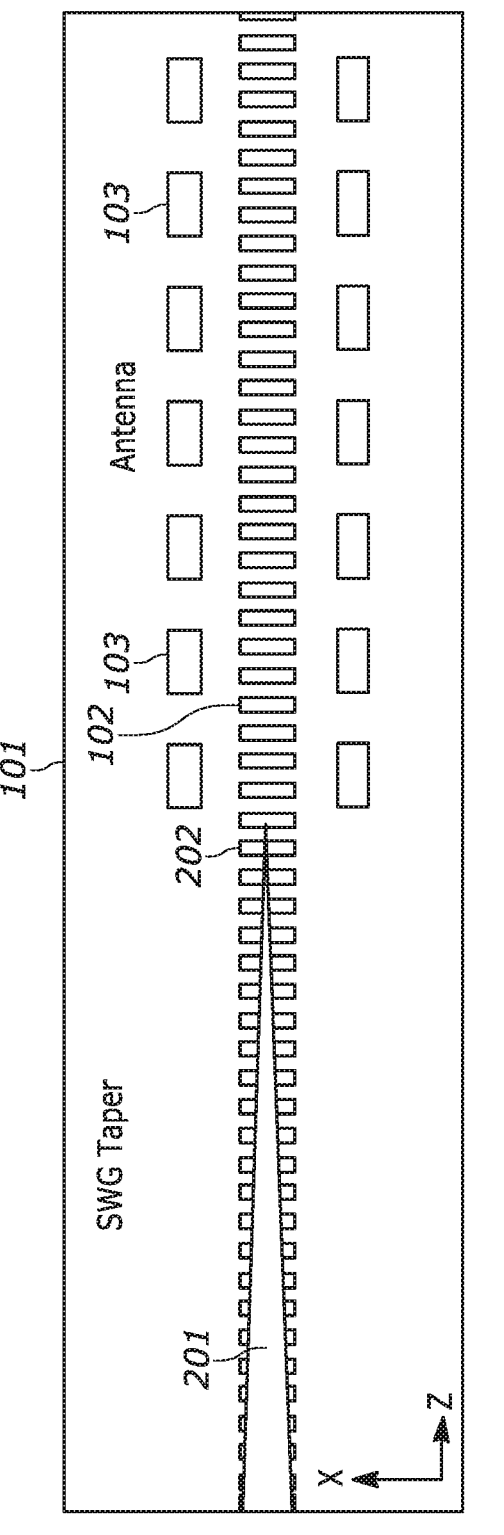
FIG. 2 is a top view showing a waveguide antenna device having a subwavelength grating core as shown in FIGS. 1a and 1b connected via a taper to a silicon interconnecting waveguide with a solid core.

The SWG waveguide core 102 can be coupled to a silicon interconnecting waveguide 201 via a taper 202, as schematically shown in FIG. 2.

The grating radiation strength and the corresponding length of the antenna determine the width of the diffracted beam in the far-field region. For long antennas ($\alpha L \gg 1$), the 3 dB far-field angular beam width is:

$$\Delta\theta_{3dB} \approx \frac{2\alpha}{k_0 \cos(\theta_0)} \tag{1}$$

where $\alpha$ is the grating strength, $\theta_0$ is the radiation angle of the antenna and $k_0 = 2\pi/\Lambda_0$ the wavenumber in free space. The radiation angle is given by the grating equation:

$$\sin(\theta_0) = n_c \sin(\theta_c) = n_{eff} - \frac{m\lambda}{\Lambda_g} \tag{2}$$

where $\theta_0$ and $\theta_c$ are the diffraction angles in the air and the upper cladding 104, respectively, $n_c$ is the cladding index, $n_{eff}$ is the effective refractive index of the waveguide mode, m is the diffraction order, $\lambda$ is the wavelength in free space, and $\Lambda_g$ is the period of the radiating grating. To characterize the diffracted beam, beam angular width in the far field is calculated in two orthogonal planes, yz and xy, as in coordinate system shown in FIGS. 1a-1e. While the beam width $\Delta\theta$ (in the yz plane) is determined by the length of the antenna, the beam width $\Delta\varphi$ (in the xy plane) is related to the far field radiation pattern of a single antenna.

Another parameter to consider is the radiation efficiency of the antenna, defined as the ratio between the power radiated upwards and the input power. An aspect of the antenna according to the illustrated embodiments is that the grating strength can be controlled, for example by varying the gap (g) or size of the radiating elements 103. This in turn allows long antennas, several millimeters or more, as required for high-resolution beam pointing in the $\theta$ direction. However, 3D finite-difference time-domain (FDTD) simulations of such long antennas require prohibitively high computational resources. To efficiently resolve this problem, the SWG waveguide mode may be calculated using 3D fully vectorial FDTD simulations of a single period of the structure. The method consists of setting periodic boundary conditions at z=0 and z=$\Lambda_g$, then enforcing a relative phase shift and exciting the structure with a broadband source. This allows us to characterize the SWG waveguide mode by determining the complex resonant frequencies. Once the mode near field is calculated, the far field can be computed from the Fraunhofer diffraction integral, i.e. the two-dimensional Fourier transform of the antenna near field. By using the Fourier method, the far field can be efficiently computed even for millimeter-long antennas. This dramatically reduces computational resources and saves simulation time.

In the exemplary embodiments of FIGS. 1a-1e and 2, the waveguide antenna device is designed for an SOI platform with a thickness (H) of silicon waveguide core 102 H=220 nm, a 3 µm buried oxide (BOX) 101 and a 2 µm SiO$_2$ upper cladding 104. For a targeted far-field narrow beam width on the order of 0.02°, the corresponding grating strength can be calculated from Eq. (1) in the range of 0.6 mm$^{-1}$-0.7 mm$^{-1}$. In order to radiate out 99% of the input power, this grating strength corresponds to antenna lengths 3.9 mm-3.3 mm. The width ($W_s$) of the lateral elements 103 and their separation (g) from the core 102 may be scanned to determine an optimal operational region with specific radiation strength and high radiation efficiency.

Figure 3:
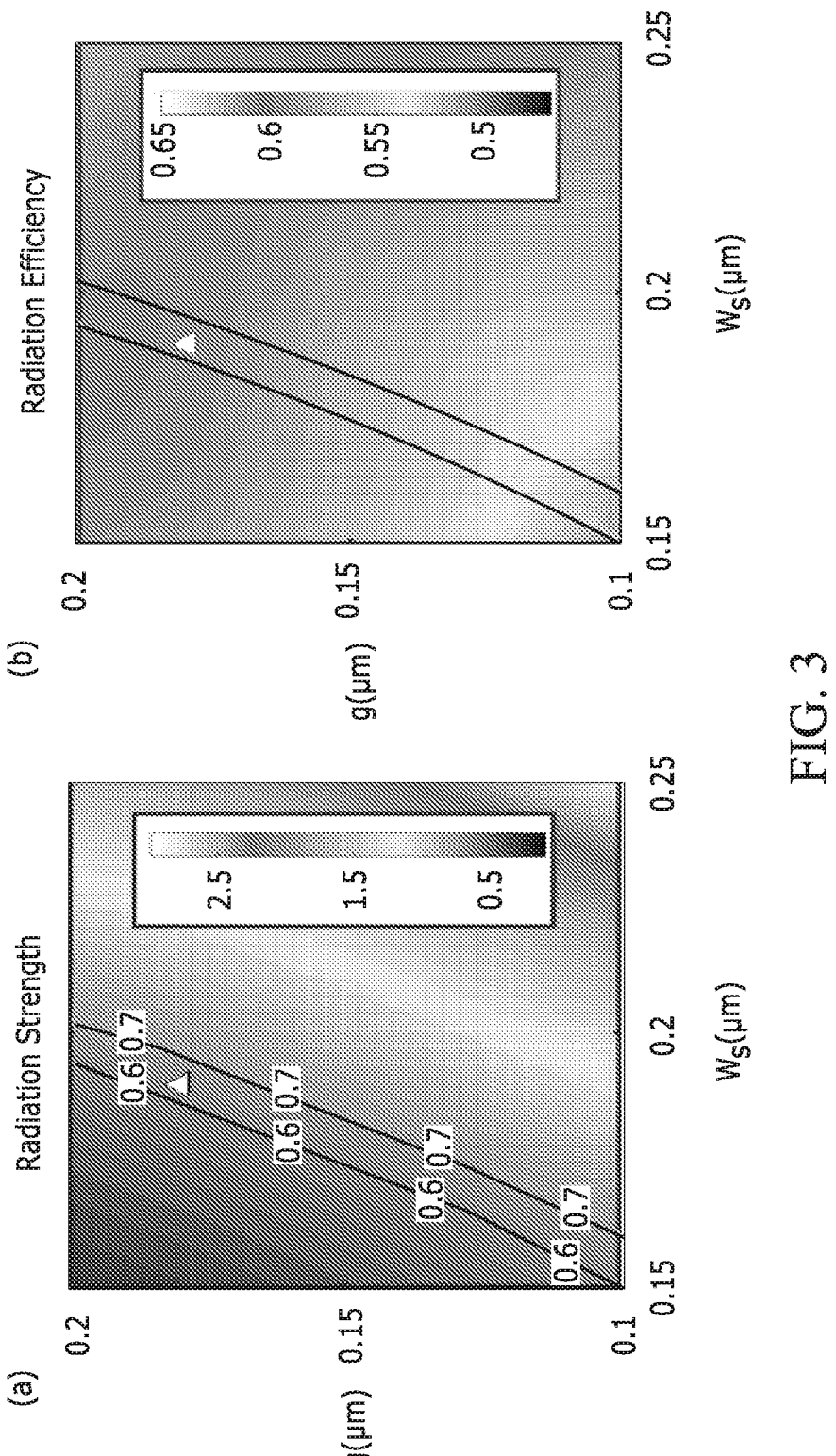
FIG. 3a shows the calculated antenna radiation strength for the waveguide antenna device of FIGS. 1a-1b.
FIG. 3b shows the calculated antenna efficiency for the waveguide antenna device of FIGS. 1a-1b.

FIG. 3a and FIG. 3b show the calculated antenna radiation strength and the efficiency for varying gap (g) and radiating element width ($W_s$) for an element length L=700 nm. It is observed that the grating strength can be efficiently controlled by these two parameters (g and $W_s$), while they have limited influence on the radiation efficiency. The calculated efficiency is 0.58, exceeding 50% due to constructive interference with the diffractive order reflected at the interface between the BOX 101 and Si substrate 100. For a gap g=180 nm and element width $W_s$=190 nm, the corresponding antenna radiation strength is $\alpha$=0.63 mm$^{-1}$ and diffraction efficiency is 58%. The antenna length required to radiate 99% of the input power is L=3.65 mm. This grating length yields a corresponding far field beam width of 0.025° radiating at −15.7°. The beam width is controlled by the antenna width, i.e. separation between the two rows of the radiating elements 103 located at the opposite (lateral) sides of the waveguide core 102. In this example, the far field angular beam width in the xy plane is $\Delta\varphi_{3dB}$=20°. The sidelobe suppression ratio in the xy plane is 7 dB, while along $\theta$ direction (yz plane) there are no visible sidelobes. These results were validated by cross-checking simulations obtained by one-period Bloch mode analysis with 3D FDTD simulations of the structure comprising several periods.

Figure 4:
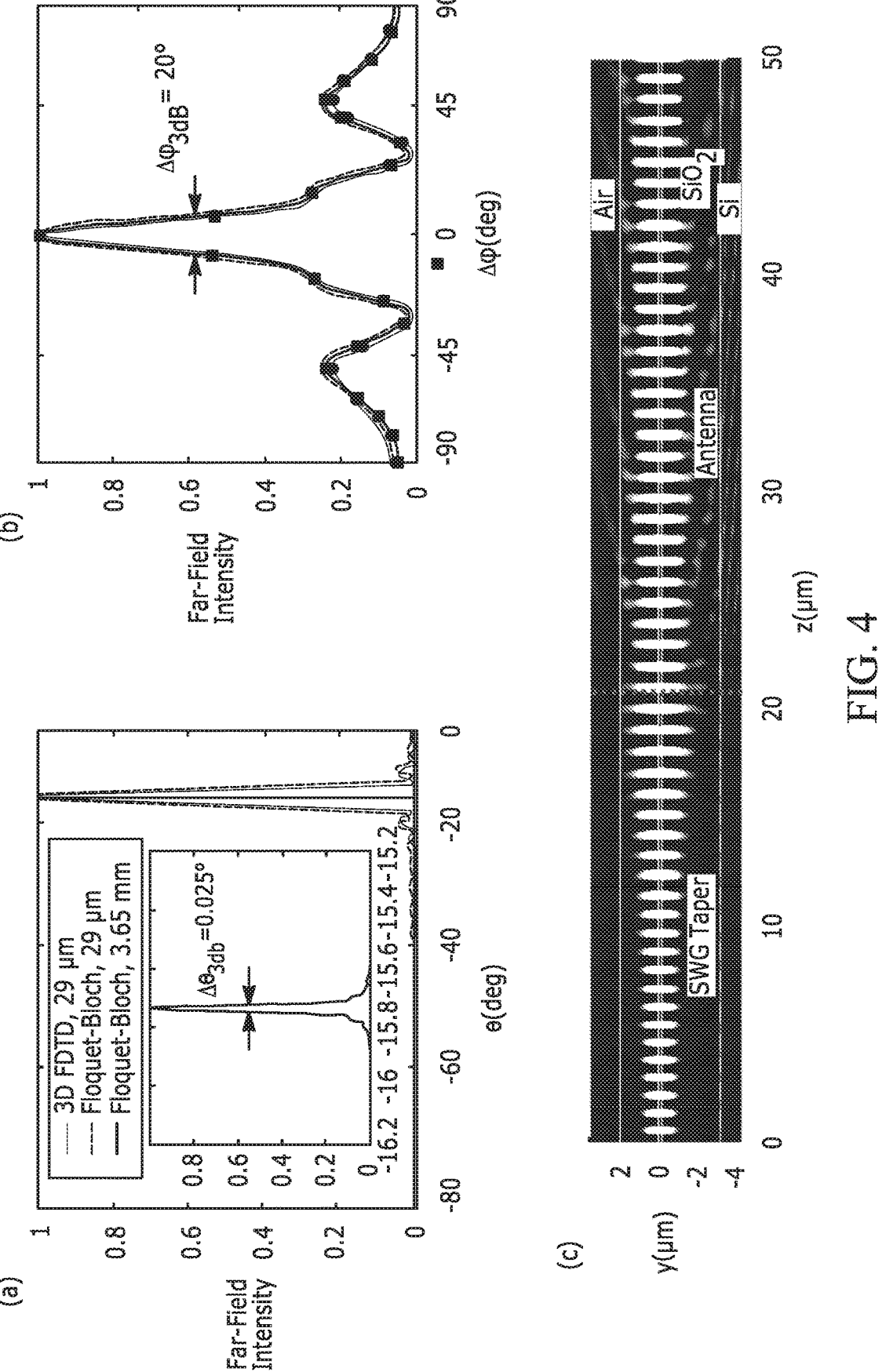
FIG. 4a and FIG. 4b show the calculated far-fields in the two respective orthogonal directions, plane yz and plane xy for the waveguide antenna device of FIGS. 1a-1b.
FIG. 4c shows the calculated near field for the waveguide antenna device of FIGS. 1a-1e.

As it is not computationally feasible to run a full 3D FDTD simulation for such long antennas (several millimeters, or more), a short antenna section was simulated comprising only 35 grating periods, where the calculated far-fields in the two orthogonal directions are shown in FIG. 4a (plane yz) and FIG. 4b (plane xy). Because of the low radiation strength of the antenna, in 35 periods, the radiated near-field profile is nearly constant, approximating a top hat function. This results in a corresponding far-field with typical sidelobes of a sinc function (FIG. 4b). The calculated near field of the antenna is shown in FIG. 4c. The radiation strength obtained from the FDTD simulation was calculated by measuring the power launched into the antenna ($P_{in}$) and the remaining power at the end of the 35 periods defined as $P_{out}=P_{in} \exp(-2\alpha L)$, yielding $\alpha$=0.7 mm$^{-1}$, close to the value obtained in the Bloch mode analysis ($\alpha$=0.63 mm$^{-1}$). This small difference can be attributed to the SWG taper loss in the 3D FDTD simulation, FIG. 4a and FIG. 4b show the results obtained using Bloch mode analysis with 35 antenna periods, yielding excellent agreement with 3D FDTD simulations. The FDTD simulation results of the Bloch mode analysis for an example of 3.65 mm long antenna are presented in FIG. 4a, showing an ultra-narrow beam width of 0.025°.

In the embodiment shown in FIG. 1c, L-shaped radiating elements 103 are used to enhance antenna radiation efficiency. The L-shaped elements are designed for a double-etch fabrication process. In this example, the shallow-etch trench of the L-shaped element ($H_e$) is 70 nm, a typical value for a double-etch fabrication process in SOL The geometry of the L-shape elements is optimized by Bloch mode analysis. This is done by scanning the element width ($W_s$) and the length of the non-etch silicon ($L_n$), yielding the radiation efficiency shown in FIG. 5a. It is observed that by using L-shape elements 103 the efficiency is substantially increased, reaching near 80%. As the efficiency increases the grating strength is reduced. This is because the efficiency increases with the length of the shallow etch trenches ($L_s$=L-$L_n$ in FIG. 1d), which results in a weaker perturbation. In this example the point of maximum efficiency and low radiation strength ($L_n$=100 nm) are selected, and the lateral elements 103 are gradually brought closer to the waveguide core 102 to obtain a grating strength of 0.6 mm$^{-1}$-0.7 mm$^{-1}$.

Figure 5:
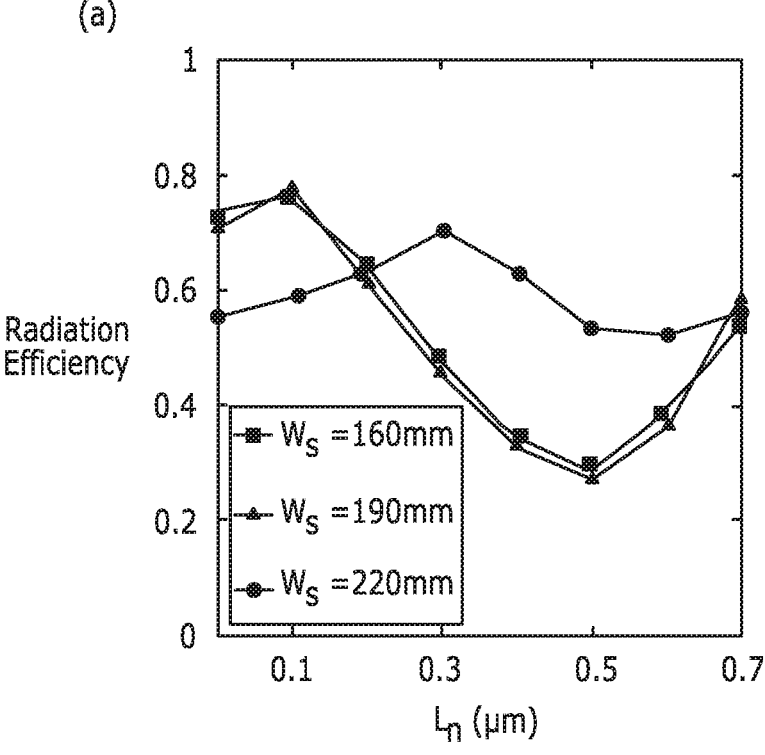
FIGS. 5a and 5b show respectively the radiation efficiency of the waveguide antenna device of FIGS. 1c-1d as a function of the geometry of the L-shaped elements, and the radiation strength and efficiency as a function of the gap g.
Figure 5:
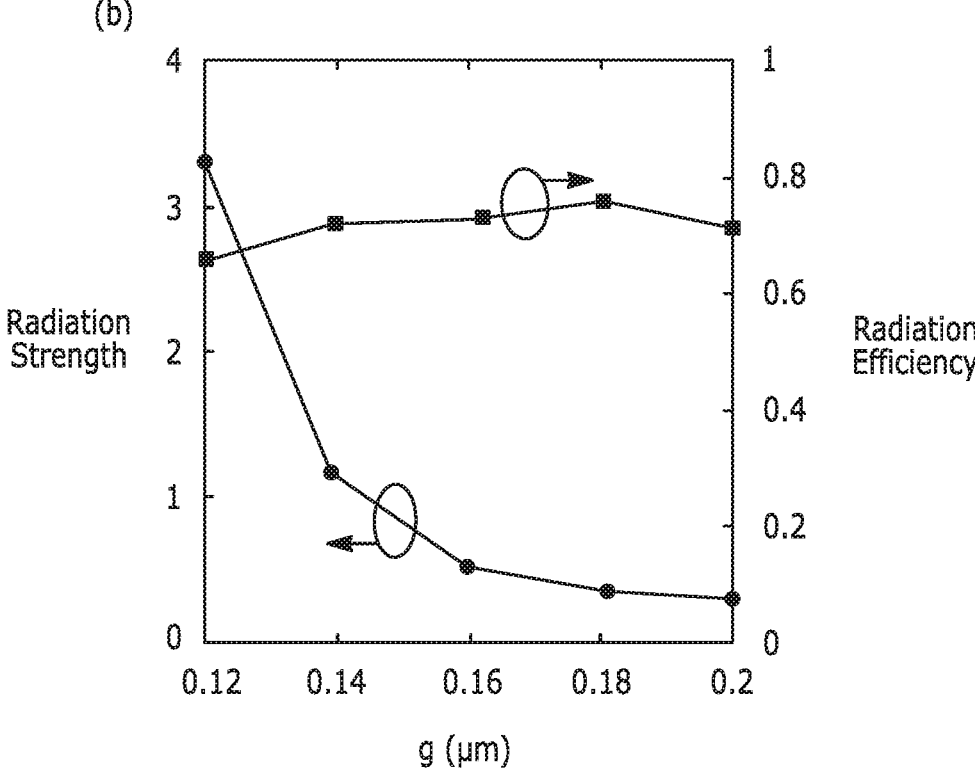

FIG. 5b shows both the grating strength and the efficiency for the antenna embodiment of FIGS. 1c and 1d with L-shaped radiating elements 103, as a function of the gap (g) between the elements and the waveguide core 102. The efficiency is not significantly affected when varying the gap. In this example, the gap is g=155 nm, the efficiency is 0.72 and the grating strength is 0.63 mm$^{-1}$, for an L-shaped element geometry of $L_n$=100 nm and $L_s$=600 nm.

Figure 6:
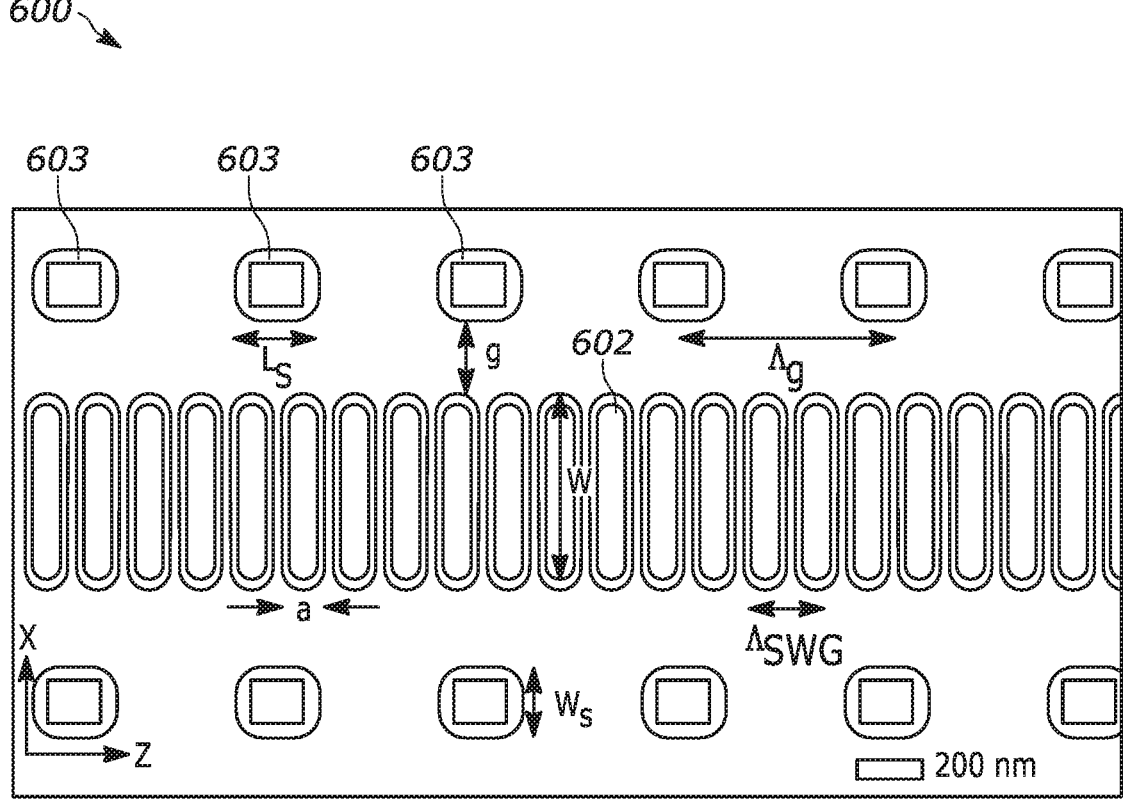
FIG. 6 shows scanning electron microscope (SEM) image of a fabricated optical antenna with a silicon subwavelength grating (SWG) waveguide core, according to the embodiments of FIGS. 1a-1b.

In the example shown in FIG. 6, a 2-millimeter-long antenna 600 was fabricated using a single etch process on a 220-nm SOI platform with a 2 µm-thick buried oxide (BOX) layer, to create SWG waveguide core 602 and radiating elements 603. The device was patterned using electron beam lithography and a reactive ion etching process. To protect the structures, a 2.2 µm upper cladding SiO$_2$ layer (not shown) was deposited by chemical vapor deposition (CVD). Finally, the chip facets (not shown) were defined with a deep-etch process. The antenna minimum feature size is 80 nm, compatible with deep-UV lithography.

In order to characterize the fabricated antenna of FIG. 6, a tunable laser was used as a light source and TE-polarized light was coupled from a lensed polarization maintaining fiber into the chip through a broadband high-efficiency metamaterial fiber-chip coupler, as described for example in Cheben, P., Janz, S., Xu, D.-X., Schmid, J., Densmore, and A., Lapointe, J., "Interface device for performing mode transformation in optical waveguides," U.S. Pat. No. 7,680, 371 B2, and was routed to the optical antenna 600 under test by a 500-nm-wide interconnecting waveguide (similar to FIG. 2). Two experimental setups were used to measure the far-field intensity pattern radiated by the antenna 600. The common element in both setups was an infrared camera with 320×256 pixels at 30-μm pitch. The first experimental setup was utilized to measure the scan range and wavelength sensitivity ($\partial\theta/\partial\lambda$). It included an achromatic lens to produce a two-dimensional Fourier transform of the near field, yielding the far-field at the lens focal plane located at the infrared sensor array. The measurement setup exhibited a minimum angular resolution of ~0.05° (limited by pixel spacing), which was insufficient for an accurate estimation of the FWHM beam width.

To increase the resolution, the second setup was used incorporating a Fourier imaging lens in combination with a relay lens. The first lens produced the two-dimensional Fourier transform of the near field at its focal plane, while the second lens relayed the far-field image to the sensor, with a magnification of about 5×, This allowed the far-field antenna pattern to be measured with a minimum resolution of 0.01°/pixel, which was adequate for an accurate determination of the beam width, at the expense of a reduced angular scanning range.

Figure 7:
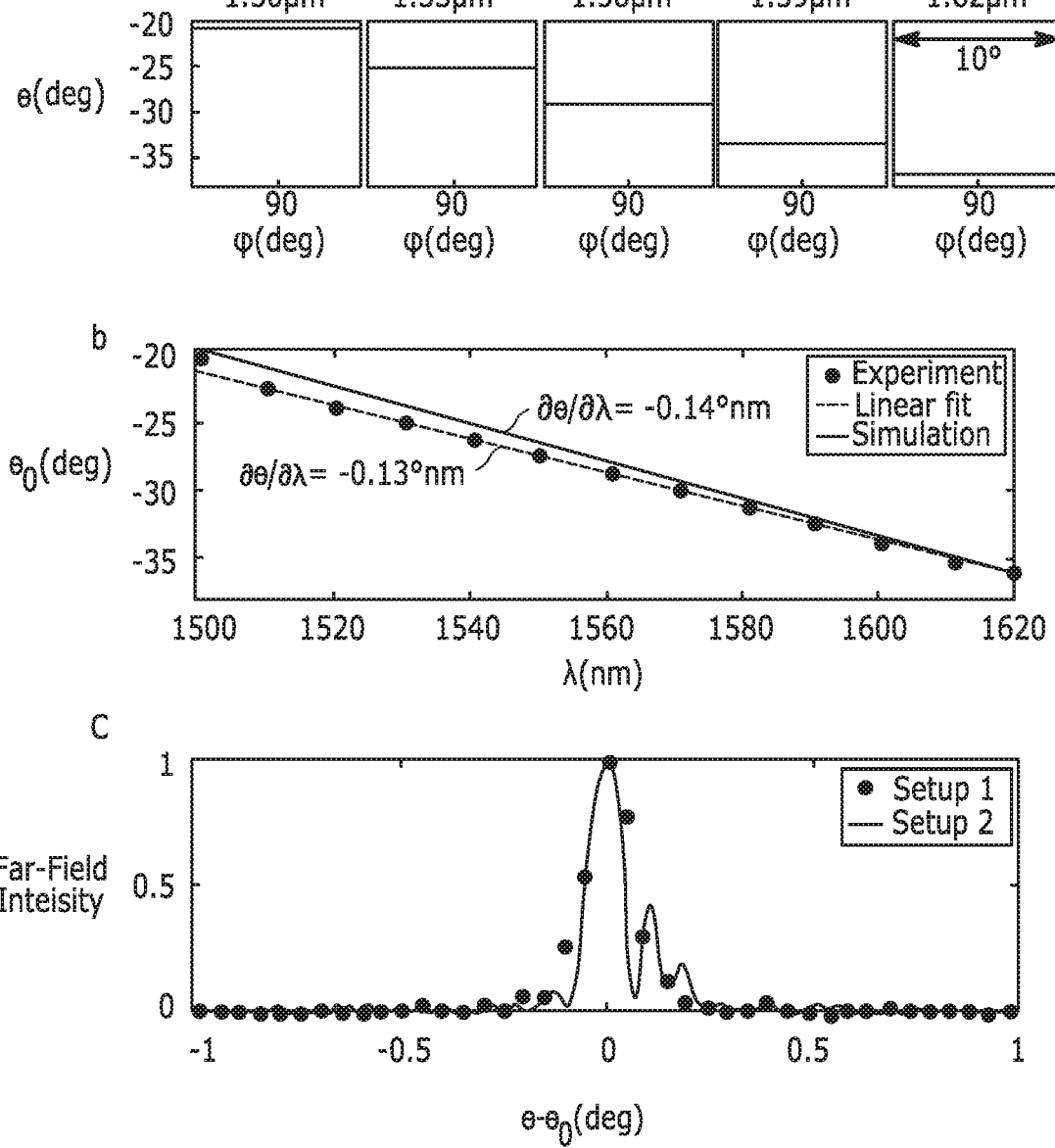
FIG. 7a and FIG. 7b show respectively the measured antenna far field and the emission angles of the fabricated optical antenna with SWG waveguide core of FIG. 6.
FIG. 7c shows the measured intensity profile of the far field radiated at a wavelength of 1550 nm of the fabricated optical antenna with SWG waveguide core of FIG. 6.

Using the first setup, the angular steering of the beam along the θ direction was measured by tuning the laser wavelength from 1500 nm to 1620 nm. The far field beam collected by the IR camera is shown in FIG. 7*a* at several wavelengths, covering a steering range of 16°. The recorded beam is collimated in the vertical direction (θ) and diverging in the azimuthal plane (φ). FIG. 7*b* shows the emission angles of the measured antenna as a function of the wavelength, yielding excellent agreement with the values obtained by electromagnetic simulations. By performing a linear fit of the measured angles, an experimental wavelength sensitivity of 0.13°/nm was calculated, which is close to the theoretically predicted value of 0.14°/nm.

The measured intensity profile of the far field radiated at a wavelength of 1550 nm is shown in FIG. 7*c*. The pattern was captured using both achromatic- and two-lens setups, the latter providing a substantially higher resolution, indicating a narrow angular beam width Δθ of ~0.1°, while the increase in divergence compared to the simulation results may be attributed to fabrication-induced phase errors along the antenna. The measured far-field diffracted angular beam width was ~0.1° and wavelength sensitivity was ~0.13°/nm.

Figure 8:
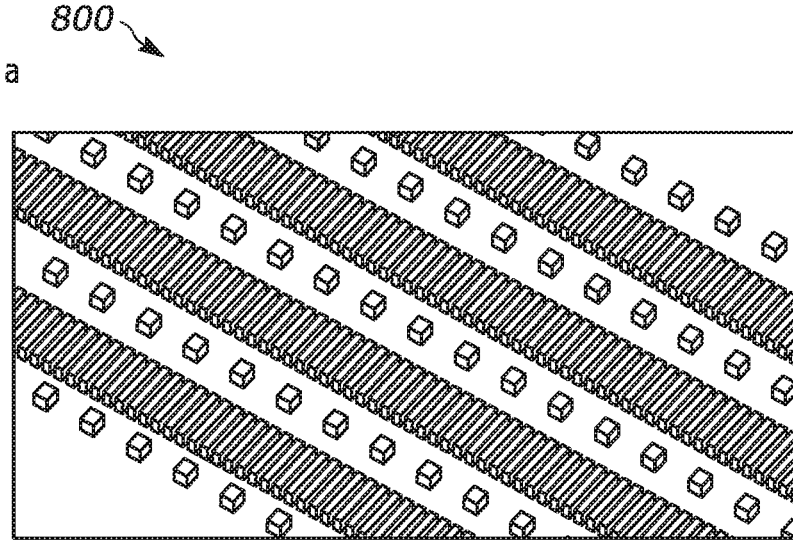
Figure 8:
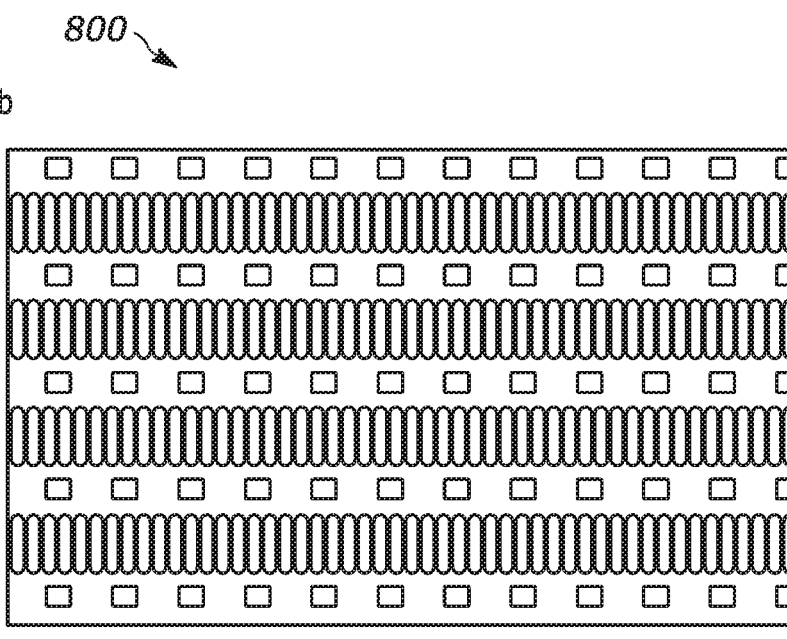

Using different antenna embodiments, an array of antennas can be implemented in a manner suitable for applications in Optical Phased Arrays (OPAs). FIG. 8*a* shows an example of a schematic of such an array 800 of waveguide antenna devices, and FIG. 8*b* shows SEM image of the fabricated array.

As it is obvious from different embodiments, a practical advantage of this invention is that it allows implementation of antennas of different lengths in optical waveguides, including high-index contrast waveguides. The antenna radiation strength can be efficiently controlled by separating radiative elements from the waveguide core. Another practical advantage is that high radiation efficiency can be achieved by using L-shaped radiating elements. Still a further advantage is that antennas can be realized in an SOI platform with minimum feature sizes larger than 40 nm (e.g. ~100 nm), which is compatible with immersion deep-UV lithography technology available at photonic foundries.

From the reciprocity principle in optics it will be understood that the method of off-chip coupling and device disclosed herein is fully bidirectional, and therefore can be used for coupling of a waveguide mode to a free-space propagating beam, i.e. a device operating in transmitter mode, as well as for coupling of a free-space propagating beam to a waveguide mode, i.e. a device operating in receiver mode.

The embodiments set forth herein offer a method of off-chip coupling between a waveguide mode and a free-space propagating beam using a waveguide antenna device comprising a waveguide core with controlled modal confinement in combination with laterally coupled radiative elements. Unlike a conventional waveguide grating, the radiative elements are physically separated from the core such that the field overlap of the mode with the radiative elements and the resulting grating strength can be efficiently controlled. Another aspect of the disclosed embodiments is the ability to control the effective refractive index contrast of the waveguide antenna device and hence its mode confinement directly by modifying the waveguide core geometry, independently from the topology of the radiating elements. In this way, the field overlap of the delocalized mode with the radiating elements and the resulting grating strength can be efficiently controlled.

In one embodiment, a far-field diffracted beamwidth is provided approaching 0.02°, which is a notable small beam divergence for a silicon photonics surface emitting device.

In another embodiment, by using L-shaped surface-emitting blocks 103 the radiation efficiency of the antenna can be substantially increased.

Contemplated applications of embodiments set forth herein include three-dimensional (3D) imaging and mapping, such as Lidar for remote sensing and navigation, autonomous car and drone navigation, secure free-space optical communications, projectors and heads-up display screens with fast-scanning light beams, geographical information systems, precision forestry, coastline management, vegetation mapping, lithography, laser writing and additive manufacturing, 3D printing, and defense innovations such as using a laser beam to precision guide missiles to their target, or countermeasures, e.g. interfering with or blinding the optical sensors of such precision-guided missiles.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may stand alone or be combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

The invention claimed is:

1. A waveguide antenna device for performing light emission to free-space, comprising:

a waveguide core having an effective refractive index to support the waveguide mode for propagating light of at least one wavelength; and an array of radiative elements arranged in a longitudinal direction along said waveguide core and laterally separated therefrom, and with a pitch to optically diffract light off a plane of the waveguide, wherein the array of radiative elements is coupled to the waveguide core, and wherein the array of radiative elements and the waveguide core are located within a same layer such that the lateral separation between the array of radiative elements and the waveguide core is within the same layer.

2. The waveguide antenna device of claim 1, wherein the waveguide core comprises a periodic subwavelength grating configured to modify the propagation mode of said light of at least one wavelength and having a pitch sufficiently less than the wavelength of the light to suppress diffraction.

3. The waveguide antenna device of claim 2, wherein at least one property of the periodic subwavelength grating is selected to change the effective refractive index, said property being selected from the group consisting of: duty ratio, pitch, width, modulation depth.

4. The waveguide antenna device of claim 2, wherein the pitch of the periodic subwavelength grating is smaller than ½ of the effective wavelength of light in the waveguide.

5. The waveguide antenna device of claim 1, wherein the waveguide core is solid and has a width chosen to provide a modified effective refractive index to control mode confinement.

6. The waveguide antenna device of claim 1, wherein at least one of lateral separation of the radiative elements from the waveguide core and the size of the radiative elements are varied along the array to achieve a gradual change in optical coupling to modify the radiated field.

7. The waveguide antenna device of claim 1, wherein the radiative elements are L-shaped to increase diffraction efficiency.

8. The waveguide antenna device of claim 1, wherein the waveguide core is configured to control the effective refractive index of the propagation mode of the light according to a particular polarization state of the light.

9. An array of waveguide antenna devices according to claim 1.

10. The waveguide antenna device of claim 1, wherein the waveguide core is coupled to a silicon interconnecting waveguide via a taper.

11. The waveguide antenna device of claim 1, wherein the radiative elements are one of either cube, cylindrical or oval shaped.

12. The waveguide antenna device of claim 1, wherein the same layer, within which the waveguide core and the array of radiative elements are arranged, comprises a buried oxide layer over a substrate.

13. The waveguide antenna device of claim 12, wherein the substrate comprises an SOI (silicon-on-insulator) Si substrate.

14. The waveguide antenna device of claim 12, wherein the buried oxide layer comprises an $SiO_2$ cladding layer.

15. The waveguide antenna device of claim 12, further including an $SiO_2$ upper cladding layer.

16. The waveguide antenna device of claim 1, wherein the minimum feature size is larger than 40 nm.

17. The waveguide antenna device of claim 16, wherein the minimum feature size is ~100 nm.

18. The waveguide antenna device of claim 1, wherein the array of radiative elements and the waveguide core are laterally separated from each other horizontally, relative to one or more of a substrate and a bottom cladding layer, on which the array of radiative elements and the waveguide core located.

* * * * *